C. N. JOHNSON.
FUSE BLOCK.
APPLICATION FILED SEPT. 17, 1913.
1,102,756.
Patented July 7, 1914.
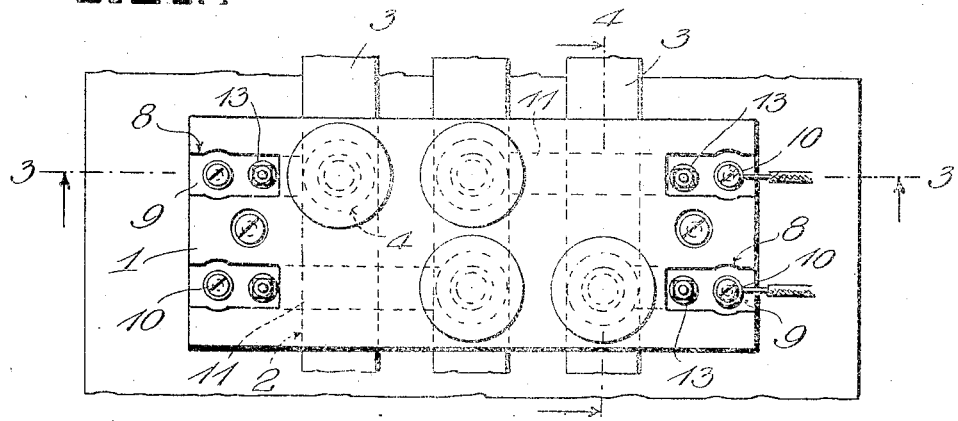
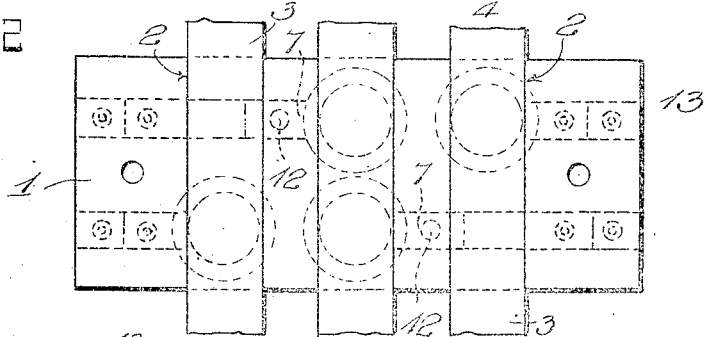
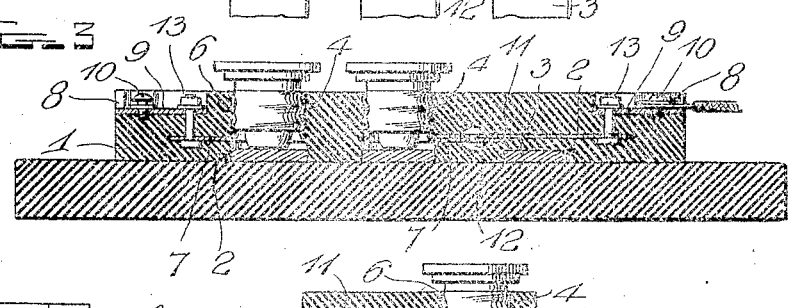
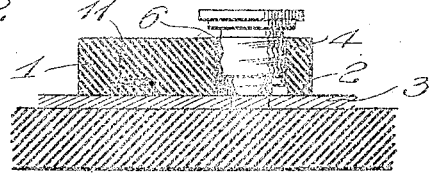
WITNESSES
INVENTOR
Chester N. Johnson
By William W. Deane
his Attorney

UNITED STATES PATENT OFFICE.

CHESTER N. JOHNSON, OF CHICAGO, ILLINOIS.

FUSE-BLOCK.

1,102,756.

Specification of Letters Patent.

Patented July 7, 1914.

Application filed September 17, 1913. Serial No. 790,209.

*To all whom it may concern:*

Be it known that I, CHESTER N. JOHNSON, a citizen of the United States, residing at Chicago, in the county of Cook and State of Illinois, have invented certain new and useful Improvements in Fuse-Blocks, of which the following is a specification.

This invention has relation to fuse blocks, and it consists in the novel features hereinafter described and claimed.

An object of the invention is to provide fuse blocks of simple design adapted to hold fuse plugs so as the plugs may have direct contact with bus bars or bus bar sections.

A further object of the invention is to so arrange the elements of the device as to prevent anything from coming in contact with the bus bars or bus bar sections and thereby reducing danger of short circuit from the main line or circuit.

With these and other objects in view, the invention consists in certain novel features of construction as hereinafter shown and described, and then particularly pointed out in the claim and in the drawings illustrative of the preferred embodiment of the invention.

Figure 1 is a front elevation of the block. Fig. 2 is a rear elevation of the same. Fig. 3 is a longitudinal sectional view of the same. Fig. 4 is a transverse sectional view of the same.

Corresponding and like parts are referred to in the following description and indicated in all the views of the accompanying drawings by the same reference characters.

The block 1, is made of clay, porcelain or other suitable non-conducting material, and as shown in Figs. 1 to 4 inclusive is provided upon its under side with transversely disposed grooves 2, which are adapted to receive the bus bars or bus bar sections 3. These bus bars are connected with the source of electric supply in any suitable manner and when bus bar sections are provided in each block, the sections of one block are connected with the sections of the adjacent block in any suitable manner or the ends of the said bus bar sections may be brought together whereby the contact of the sections throughout the series of sections is completed. The block 1 is provided with openings 4 which pass transversely through the same and open at their inner ends to the grooves 2 hereinbefore described. Metallic rings 6 are located in the openings 4, and are provided with pressed threads adapted to engage the threads of the usual fuse plugs. Each ring 6 is provided at one side and at its inner end with a metallic shank 7. The block 1 is provided at its outer side and at its end with grooves 8 in which plates 9 are located. Posts 10 are connected to the plates 9 and wires may be connected with said posts and led to lights or other fixtures which are to be supplied with the current. If desired switches may be provided for cutting off the current to the said wires. Strips 11 are embedded in the block and are connected at their inner ends with the shanks 7 of the innermost rings 6 by means of screws 12 or other suitable devices. Screws 13 pass transversely through the block 1 and are connected at their inner ends with the shanks 7 of the outermost ring 6 and the outer ends of the strips 11, and the outer portions of the said screws 13 are connected with the plates 9. The bus bars and bus bar sections may be connected with circuit carrying currents of high and low voltage and they may also be connected with direct or alternating circuits. Therefore it will be seen that a fuse plug block of simple structure is provided and that the same occupies but little space when mounted upon a panel, and the current is transmitted in a direct manner from the bus bars to the wires, which convey the current through the light or other fixtures.

Having described the invention what is claimed, is:—

A fuse block comprising a body provided upon its underside with transversely disposed grooves, bus bar sections located in said grooves, said body having openings passing transversely therethrough and communicating at their inner ends with said grooves, rings located in the openings and having shanks which are embedded in the block, strips connected with the shanks of the innermost rings and also embedded in the block, and means for connecting said strips and the shanks of the outermost ring with terminals at the outer side of the block.

In testimony whereof I affix my signature in presence of two witnesses.

CHESTER N. JOHNSON.

Witnesses:
JOHN F. VOIGT,
HARRY B. THOMPSON.